(12) United States Patent
Liu et al.

(10) Patent No.: US 7,963,172 B2
(45) Date of Patent: Jun. 21, 2011

(54) MULTIPHASE FLOWMETER USING A COMBINATION OF PRESSURE DIFFERENTIALS AND ULTRASOUND DOPPLER READINGS

(75) Inventors: Zhu Liu, Shanghai (CN); Zhaorong Liu, Shanghai (CN)

(73) Assignee: Shanghai Medeng Electronic Equipment Co. Ltd., Shanghai (CN)

( * ) Notice: Subject to any disclaimer, the term of this patent is extended or adjusted under 35 U.S.C. 154(b) by 0 days.

(21) Appl. No.: 12/670,669

(22) PCT Filed: Oct. 29, 2007

(86) PCT No.: PCT/CN2007/003068
§ 371 (c)(1),
(2), (4) Date: Jan. 26, 2010

(87) PCT Pub. No.: WO2009/018694
PCT Pub. Date: Feb. 12, 2009

(65) Prior Publication Data
US 2010/0199779 A1    Aug. 12, 2010

(30) Foreign Application Priority Data
Aug. 7, 2007  (CN) .......................... 2007 1 0044625

(51) Int. Cl.
*G01F 1/74* (2006.01)
(52) U.S. Cl. .................................................. 73/861.04
(58) Field of Classification Search ............... 73/861.04, 73/861.28, 861.27, 861.18, 861.02
See application file for complete search history.

(56) References Cited

U.S. PATENT DOCUMENTS

| | | | |
|---|---|---|---|
| 4,995,266 A * | 2/1991 | Tobita et al. .................... 73/706 |
| 5,591,922 A | 1/1997 | Segeral et al. |
| 5,929,342 A * | 7/1999 | Thompson ................. 73/861.04 |
| 6,338,276 B1 | 1/2002 | Durando et al. |
| 6,345,536 B1 | 2/2002 | Morrison et al. |
| 6,422,092 B1 * | 7/2002 | Morrison et al. .......... 73/861.04 |
| 6,935,189 B2 | 8/2005 | Richards |
| 2007/0089609 A1 | 4/2007 | Dou et al. |

FOREIGN PATENT DOCUMENTS

| | | |
|---|---|---|
| CN | 1182873 A | 5/1998 |
| WO | 0244664 A1 | 6/2002 |
| WO | 2009018694 A1 | 12/2009 |

OTHER PUBLICATIONS
International Search Report; 4 Pages; Dated May 22, 2008.

* cited by examiner

*Primary Examiner* — Jewel Thompson
(74) *Attorney, Agent, or Firm* — Dickson Wright PLLC

(57) ABSTRACT

A multiphase flowmeter, and a method of analyzing and measuring multiphase flow is described. The body of the multiphase flowmeter consists of the following components. It has a straight flow pipe in which two orifice plates a lodged near the extremities. At each of these two locations, a pressure differential transmitter measures the pressure drop that occurs as the fluid passes through the orifice plates. Along the length between the orifice plates, an ultrasound Doppler sensor measures the volume flow rate of the multiphase fluid, a pressure transmitter measures the in-pipe pressure and a temperature sensor measures the temperature. From the signals obtained from the above sensors, an overall analysis of the multiphase fluid flow is performed providing a complete set of flow measurement data for the mixture and for each of the three phases consisting of oil, water and gas.

7 Claims, 1 Drawing Sheet

MULTIPHASE FLOWMETER USING A COMBINATION OF PRESSURE DIFFERENTIALS AND ULTRASOUND DOPPLER READINGS

CROSS REFERENCE TO RELATED APPLICATION

This application is a National Stage of International Application No. PCT/CN2007/003068, filed Oct. 29, 2007. This application claims the benefit and priority of Chinese Application No. 200710044625.8, filed Aug. 7, 2007. The entire disclosure of each of the above applications is incorporated herein by reference.

FIELD OF INVENTION

The present invention relates to an apparatus and method of analysis for the measurement of a multiphase fluid flow. The invention is particularly, but not exclusively, suitable for measuring the flow of multiphase fluids that are produced in oil and gas wells, on shore and off shore installations, pipe lines and in refineries.

BACKGROUND OF THE INVENTION

The oil and gas industry is increasingly calling for the development of a new technology that is compact, light weight and most importantly affordable, which can be installed "in-line" and produce a complete set of accurate measurements on each component of multiphase flow.

Various devices are used in the industry, however none is considered capable of meeting satisfactorily all the requirements that are posed by wide ranging set of field conditions in the industry. No single device handles the many flow and fluid conditions that are encountered due to both geological conditions and industrial methods of extraction, and/or meets the precision requirements over the full extent of the large range of flow rates, water cut, and gas fraction that occur in the field. As a result, the devices that exist tend to find niche applications only, or they are combined with other equipments and devices in order to fully service the flow measurements of multiphase fluids. In addition, several devices make use of radioactive sources, which hold significant disadvantages. The use of these sources imposes careful and important containment requirements to mitigate the possibility of contamination, and as a result the industry is reluctant to fully accept methods making use of radioisotopes.

Commercialized MPFMs (multiphase flowmeters) can roughly be divided into two categories:

The first category is based on a pre-requisite step of separation of the liquid and gas phases. Once the liquid and gas phases are separated, the flow measurements are conducted upon the liquid phase and the gas phase separately. The principles of such a method are simple and well known at large and good precision in measurement is generally achieved. This category of MPFM has been widely accepted in the oil industry worldwide. One example is U.S. Pat. No. 6,338,276 B1. The separation of liquid and gas phases are usually achieved using gravity or centrifugal forces. The equipment, called separators, is generally large, difficult to install and relatively costly. The degree of precision/imprecision of the measurements is directly affected by the efficiency of the separation process and compounded by the inherent precision/imprecision of the individual and separate measurements of the liquid and gas phases that are performed after the separation. Room for improvement of the achievable precision inherent to this method is therefore limited. In addition measurements are neither performed in-line or on a real-time.

The second category of MPFMs does not require any fluid pre-separation. It measures directly the various parameters of the multiphase flow. It generally uses an orifice or venturi flowmeter for flow rate measurement. It also uses Gamma radioisotopes, microwaves or capacitance/impedance watercut meters to independently measure watercut and GOR. Generally this method can perform inline real-time measurements of multiphase flow with an acceptable level of precision/imprecision, and it has achieved a degree of acceptance by the industry. An example of this category of device is provided by the Framo Phase Watch VX and U.S. Pat. No. 6,935,189 B2. However, because the method used by such devices is sensitive to interferences in flow regimes and in patterns of multiphase flow, the stability of the measurements represent an issue that is not fully resolved by the technology. In addition, in many areas of the world the water fraction contained in the fluid is disturbed with varying degrees of salinity, affecting the density of the water and the precision of measurements that use impedance/capacitance techniques. The structure of the MPFMs in this category is generally complex and costly. The calibration, installation and maintenance all poses significant operational challenges to the industry.

The main objective of the present invention is to meet the many requirements of the industry with a device that is completely self-sufficient, flow regime independent, compact, light-weight, easy to install and accurate in measuring multiphase flow.

SUMMARY OF THE INVENTION

By performing a complete analysis of the multiphase fluid on the basis of the pressure and ultrasound sensors within the device, this invention solves the problems associated with radio-active sources and with the need to make use of combined technologies.

The technology presented here is therefore different with other existing and published technologies and methods. The following aspects, either individually or combined, constitute this differentiation:

The present invention does not require any pre-conditioning of the multiphase flow, such as pre-separation of the gas and fluid and/or mixing.

The present invention does not make use of upstream or downstream devices to measure water fraction or perform separately other two-phase in well measurements such as gas-oil ratio. In other words it is self sufficient in the sense that it analyses and measures multiphase flow completely from direct readings performed by the device's sensors.

The present invention does not make use of any radioactive sources.

The present invention is simple, accurate with measurement stability and repeatability.

First the pressure differentials are obtained from the transmitters located at the two orifice plates, a volume flow rate of the mixture is obtained from the ultrasound Doppler sensor. From these data, the microcomputer calculates the gas-liquid ratio, the watercut and the flow rates of the gas, water and oil phases. The in-pipe gas flow rate is then converted to a gas flow rate under standard atmospheric pressure.

The invention provides the measurements of volume and mass flow rates and respective cumulative for each individual phase of oil, water and gas, and for the total mixture, as well as the watercut and the gas-liquid ratio.

BRIEF DESCRIPTION OF THE DRAWINGS

These and other aspects of the invention will become apparent from the following description, when taken in combination with accompanying drawings, in which.

SYMBOLS USED IN THE DIAGRAMS

Figure 1:
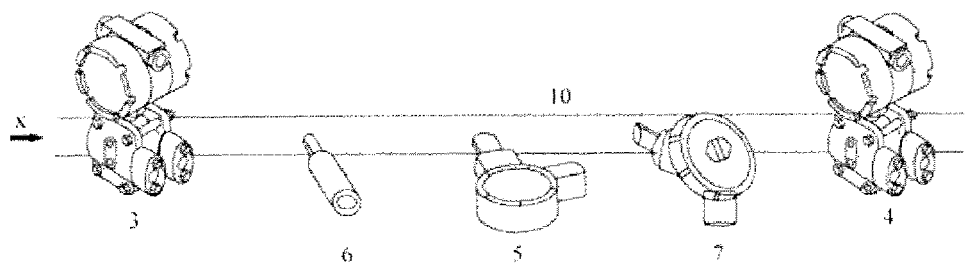
FIG. 1 is a diagrammatic view of the multiphase mass flowmeter.
Figure 2:
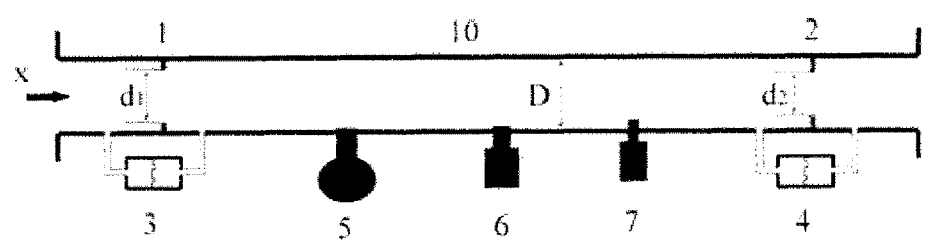
FIG. 2 illustrates the design principal of the multiphase mass flowmeter.

10 is the uniform pipe
1 is the upstream orifice plate
2 is the downstream orifice plate
3 is the differential pressure transmitter at the upstream orifice plate
4 is the differential pressure transmitter ate the downstream orifice plate
5 is the ultrasound Doppler sensor
6 is the pressure transmitter
7 is the temperature transmitter
8 is a microcomputer
9 is the display module
D is the inner diameter of the uniform pipe
$d_1$ is the diameter of orifice plate 1
$d_2$ is the diameter of orifice plate 2
X is the direction of flow

DETAILED DESCRIPTION OF THE INVENTION

The following parameters are defined for use in the equations that follow in this description:
$c_{d1}$=flow rate coefficients of orifice plate 1
$c_{d2}$=flow rate coefficients of orifice plate 2
D=diameter of uniform pipe
$d_1$=inner diameter of orifice plate 1
$d_2$=inner diameter of orifice plate 2
$dp_1$=pressure differential at orifice plate 1
$dp_2$=pressure differential at orifice plate 2
$n_1$=gas liquid ratio (GLR)
$Q_s$=flow rate obtained with the ultrasound Doppler
$Q_{L1}$=flow rate of liquid
$Q_{m1}$=mass flow rate at orifice plate 1
$Q_{m2}$=mass flow rate at orifice plate 2
$Q_1$=volume flow rate at orifice plate 1
$Q_2$=volume flow rate at orifice plate 2
$Q_{g1}$=gas phase volume flow rate
$Q_{w1}$=water phase volume flow rate
$Q_{o1}$=oil phase volume flow rate
$\rho_1$=density of total mixture at orifice plate 1
$\rho_2$=density of total mixture at orifice plate 2
$WR_1$=water cut Reference is made to FIG. 1 of the drawings which depicts a uniform flow pipe 10 of diameter D. Along the direction of the flow, as indicated by the arrow X, two orifice plates 1 and 2 are placed at defined locations. The upstream orifice plate 1 and the downstream orifice plate 2 have inner diameters $d_1$ and $d_2$ respectively. At a defined location between the orifice plates 1 and 2, an ultrasound Doppler 5 is installed. At arbitrary locations between the two orifice plates, a pressure transmitter 6 and a temperature transmitter 7 are installed.

When multiphase flow passes through the uniform pipe 10, along the direction X, a pressure drop takes place at orifice plate 1 due to the localized constraining of the flow area. This pressure drop $dp_1$ is measured by the differential pressure transmitter 3. Similarly, at orifice plate 2, the pressure drop $dp_2$ takes place and is measured by the differential pressure transmitter 4. In between these two points, the ultrasound Doppler flowmeter 5 measures the flow rate $Q_s$, the pressure transmitter 6 measures the pressure P and the temperature transmitter 7 measures the temperature T. This invention and its method for analyzing multiphase flow and for measuring the individual flow rates for the phases (oil, water and gas) makes use of the above parameters, which are measured directly.

The mass flow rates of the total mixture when passing through orifice plates 1 and 2 are obtained independently as follows:

$$Q_{m1} = \frac{c_1 c_{d1} d_1^2}{\sqrt{1-\left(\frac{d_1}{D}\right)^4}} \sqrt{\rho_1 dp_1} \tag{1}$$

$$Q_{m2} = \frac{c_2 c_{d2} d_2^2}{\sqrt{1-\left(\frac{d_2}{D}\right)^4}} \sqrt{\rho_2 dp_2}$$

where $$c_1 = c_2 = \frac{\pi}{4}\sqrt{2}$$

and let $$k_1 = \frac{d_1^4}{1-\left(\frac{d_1}{D}\right)^4}, \quad k_2 = \frac{d_2^4}{1-\left(\frac{d_2}{D}\right)^4} \tag{2}$$

From the mass flow rate conservation, then:

$$Q_{m1}=Q_{m2}$$

Applying equation (1) to the above, one gets $$G = \frac{k_2 dp_2}{k_1 dp_1} = \frac{\rho_1}{\rho_2} = \frac{Q_2}{Q_1} \tag{3}$$

$$\text{where } Q_1 = \frac{Q_{m1}}{\rho_1} \text{ and } Q_2 = \frac{Q_{m2}}{\rho_2}$$

Here using subscripts o, w and g to represent oil, water and gas, then:

$$Q_1=Q_{o1}+Q_{w1}+Q_{g1}$$

$$Q_2=Q_{o2}+Q_{w2}+Q_{g2} \tag{4}$$

From orifice plate 1 to 2, the volume flow rates of oil, water and gas in the multiphase flow will satisfy the following linear relationships, $$Q_{o2}=aQ_{o2}, \; Q_{w2}=bQ_{w1}, \; Q_{g2}=cQ_{g1}$$

Where a, b and c are the coefficients of linearity for each phase relating the volume flow rate in orifice plate 1 to the volume flow rate in orifice plate 2. From Equation (3), $$G = \frac{k_2 dp_2}{k_1 dp_1} = \frac{aQ_{o1} + bQ_{w1} + cQ_{g1}}{Q_{o1} + Q_{w1} + Q_{g1}} \quad (5)$$

After the multiphase flow passes orifice plate 1, the watercut $WR_1$ and the gas liquid ratio (GLR) defined as $n_1$ are:

$$WR_1 = \frac{Q_{w1}}{Q_{o1} + Q_{w1}}, \quad n_1 = \frac{Q_{g1}}{Q_{o1} + Q_{w1}} \quad (6)$$

From Equation (5):

$$G = \frac{k_2 dp_2}{k_1 dp_1} = \frac{a(1 - WR_1) + bWR_1 + cn_1}{1 + n_1} \quad (7)$$

Obviously, the coefficients a, b and c can be expressed by the values of G at pure oil, pure water and pure gas phase states:

$$a = G|_{pure\ oil}\ b = G|_{pure\ water}\ c = G|_{pure\ gas}$$

On the other hand, the volume flow rate $Q_s$ obtained by the ultrasound Doppler sensor and the liquid phase flow rate $Q_{L1}$ have the following relationship:

$$Q_s = \frac{1}{s} Q_{L1} \quad (8)$$

Therefore, $$Q_{o1} + W_{w1} + Q_{g1} = Q_{L1} + Q_{g1} = sQ_s + Q_{g1} \quad (9)$$

$$\frac{Q_1 - Q_{L1}}{Q_{L1}} = \frac{Q_{g1}}{Q_{L1}} = \frac{Q_{g1}}{sQ_s} = n_1 \quad (10)$$

Combining Equations (7) and (9), the GLR $n_1$ and watercut $WR_1$ can be expressed using the ultrasound Doppler flow rate $Q_s$, the coefficients a, b and c, and the various G values under pure phase states.

Especially under the condition of pure liquid flow (only oil and water phases combined), $Q^{g1} = 0$, or when GOR $n_1 = 0$, from Equation (7), the watercut $WR_1$ can be directly expressed using G as follows:

$$G = \frac{k_2 dp_2}{k_1 dp_1} = (b - a)WR_1 + a \quad (11)$$

Finally, after the liquid phase volume flow rate $Q_{L1}$ is determined by Equation (8), the volume flow rates of gas, water and oil phases can be expressed as:

$$Q_{g1} = n_1 Q_{L1}$$

$$Q_{w1} = WR_1 \cdot Q_{L1}$$

$$Q_{n1} = (1 - WR_1) Q_{L1} \quad (12)$$

Figure 3:
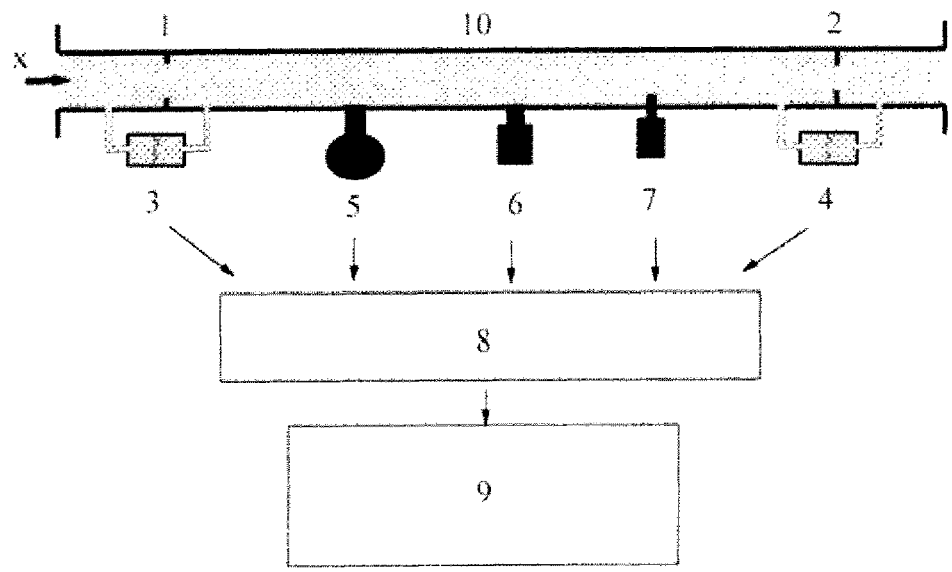
FIG. 3 is the working flowchart of the multiphase mass flowmeter.

FIG. 3 gives the flowchart of the multiphase mass flowmeter. The pressure differential readings $dp_1$ and $dp_2$ from the pressure differential transmitters 3 and 4, as well as the volume flow rate $Q_s$ from the ultrasound Doppler flowmeter 5, are inputted into the intelligent microcomputer 8, where the software calculates GOR $a_1$ and watercut $WR_1$ using Equations (10) and (7). Finally, the software will calculate the individual phase flow rates of gas, water and oil using Equation (12). In FIG. 3, the pressure P and temperature T from transmitters 6 and 7 enable the conversion of the above gas phase flow rate into a standard atmospheric value. As per the design principle illustrated in FIG. 3, the parameters computed by the invention are displayed on the display module 9, including:

Flow pressure
Flow temperature
Pressure differential across the device
Actual oil flow rate
Standard oil flow rate
Actual water flow rate
Actual water cut
Standard water cut
Actual gas flow rate
Standard gas flow rate
Mix density
Mix velocity
Actual gas volume fraction
Standard gas volume fraction
Standard gas oil ratio
Accumulated oil volume in actual condition
Accumulated oil volume in standard condition
Accumulated water volume in actual condition
Accumulated water volume in standard condition
Accumulated gas volume in actual condition
Accumulated gas volume in standard condition It is evident that components of the body of the flowmeter could be disposed in a variety of configurations without departing from the scope of the invention. Although all flowmeters are shown as a compact structure with means of creating and measuring pressure differentials in a single conduit, it will be appreciated by persons skilled in the art that the components can be disposed in different orders or widely spaced with respect to each other.

The following are the principal advantages of the present invention. Radioactive sources are not used. The device is self sufficient in the sense that it analyses and measures multiphase flow without requiring other devices to be installed upstream or downstream in order to measure water cut or perform other two-phase in well measurements. It does not need other upstream devices to perform fluid separation or fluid conditioning. The system is compact and easily installed on any single conduit at any point immediately downstream of the well head.

What is claimed is:

1. A multiphase flowmeter for measuring the flow of a multiphase fluid including oil, water and gas flowing through an in-well conduit, said flowmeter comprising:
   two orifices plates having inner diameters respectively where disposed in said conduit at locations near the extremities of a uniform flow pipe where pressure differentials are measured with two pressure differential transducers;
   an ultrasound Doppler sensor between said two orifices plates;
   a pressure transmitter; and
   a temperature transmitter.

2. A flowmeter as in claim 1 where the ultrasound Doppler sensor, pressure transmitter and temperature transmitter are disposed over a plurality of tubular members or in different order or locations.

3. A flowmeter as in claim 1 where the intelligent microcomputer calculates the individual phase flow rates of gas, water and oil with a pressure differential at one orifice plate (dp1) and a pressure differential at the other orifice plate (dp2)

from the pressure differential transmitters, the volume flow rate (Qs) from the ultrasound Doppler sensor as well as the pressure (P) and temperature (T) from transmitters.

4. A flowmeter as in claim 3 where a display unit is connected to the intelligent microcomputer to receive and display the values of the individual phase flow rates of gas, water and oil that have been calculated.

5. A method of measuring the flow rate of components of the multiphase fluid including oil, water and gas flowing in an in-well conduit, said method comprising the steps of:
    measuring the pressure differentials at the two orifice plates having inner diameters respectively;
    measuring the mixture volume flow rate at with the ultrasound Doppler sensor between said two orifices plates; and
    measuring in-pipe pressure and temperature at any point between the two orifice plates, and processing the two pressure differentials at the two orifice plates, the flow rate at the ultrasound Doppler sensor, the in-pipe pressure and temperature measurements to provide a volume and mass flow rate of the total mixture and of each component of said multiphase fluid comprising oil, water and gas, a watercut measurement and a gas liquid ratio measurement.

6. A method as in claim 5 where the intelligent microcomputer calculates the individual phase flow rates of gas, water and oil with a pressure differential at one orifice plate (dp1) and a pressure differential at the other orifice plate (dp2) from the pressure differential transmitters, the volume flow rate (Qs) from the ultrasound Doppler sensor as well as the pressure (P) and temperature (T) from transmitters.

7. A method as in claim 6 where a display unit is connected to the intelligent microcomputer to receive and display the values of the individual phase flow rates of gas, water and oil that have been calculated.

* * * * *